Sept. 29, 1931.   H. H. PATTON   1,825,539
METHOD AND APPARATUS FOR TESTING VEHICLE BRAKES
Filed April 9, 1928   2 Sheets-Sheet 1
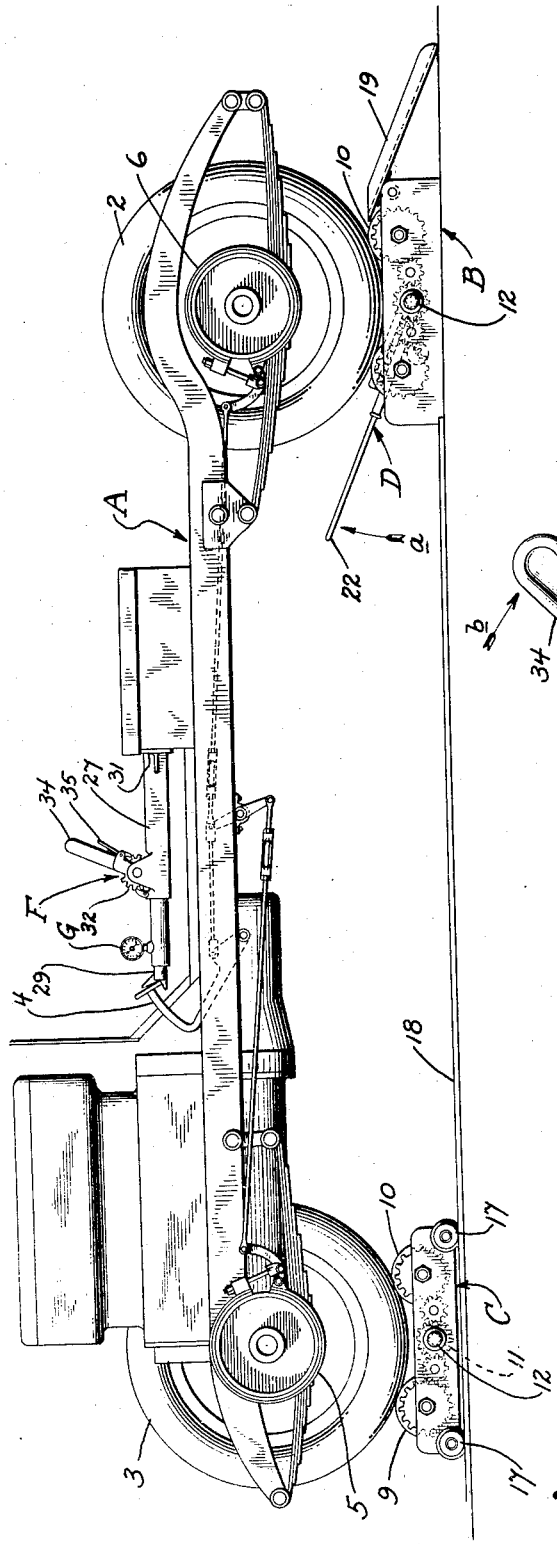
INVENTOR.
Harry H. Patton.
BY
Townsend, Loftus & Abbett
ATTORNEYS.

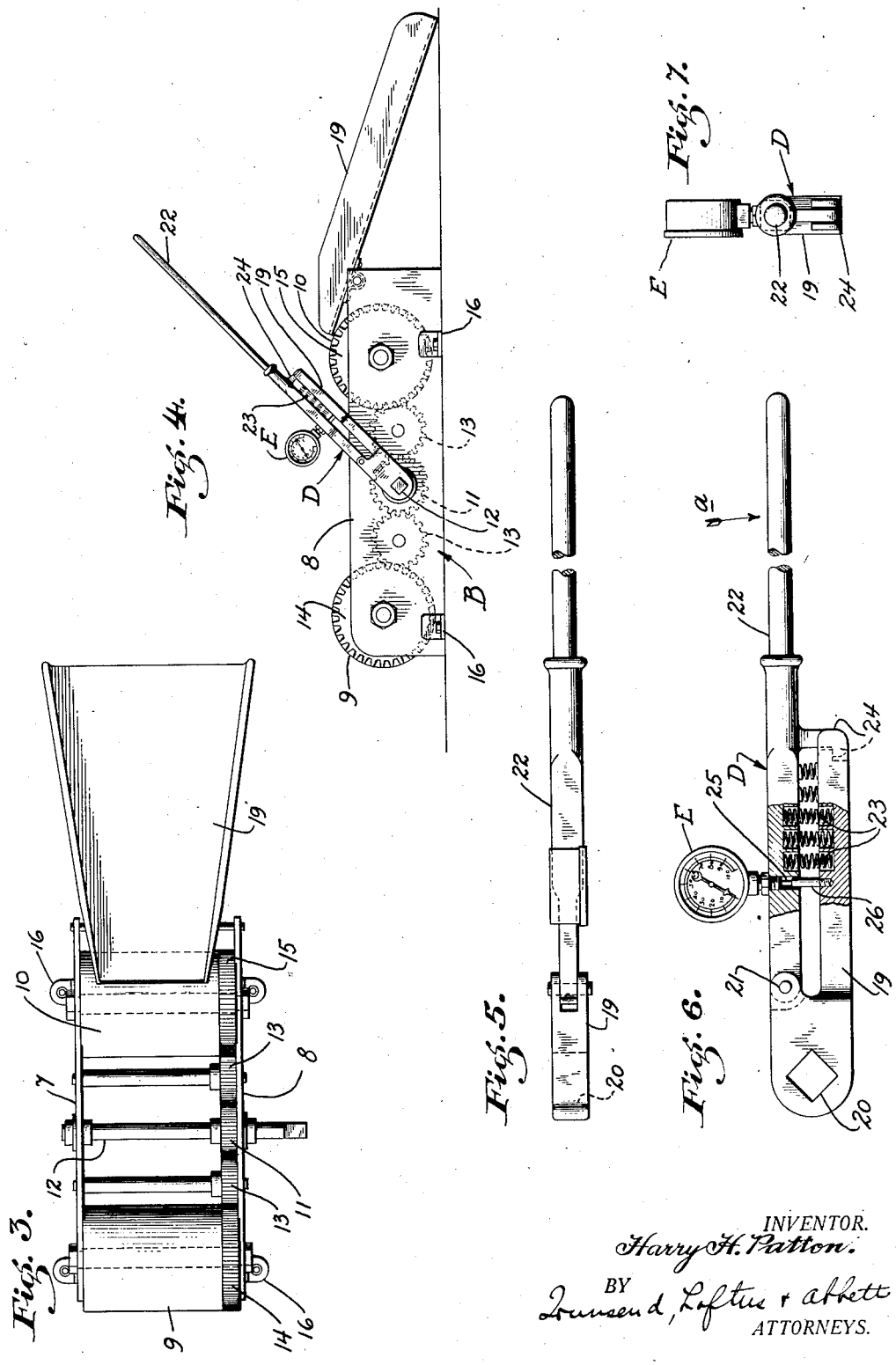

Patented Sept. 29, 1931

1,825,539

UNITED STATES PATENT OFFICE

HARRY H. PATTON, OF OAKLAND, CALIFORNIA, ASSIGNOR TO BRAKE-TESTING EQUIPMENT CORPORATION, OF SAN FRANCISCO, CALIFORNIA, A CORPORATION OF CALIFORNIA

METHOD AND APPARATUS FOR TESTING VEHICLE BRAKES

Application filed April 9, 1928. Serial No. 268,398.

This invention relates to a method and apparatus for testing vehicle brakes.

When adjusting or testing the brakes of a vehicle, such as an automobile whether it is equipped with two or four-wheel brakes, it is essential that the brakes grip or exert a uniform pressure when the brake pedal is depressed as the efficiency of the braking equipment and the life of the brake lining are materially reduced unless uniform pressure is applied by each brake.

The common method of testing and adjusting brakes requires a helper and a mechanic, the helper to depress the brake pedal and the mechanic to adjust and manually rotate each wheel against the pressure of the brake. Perfect adjustment of the brakes or uniform application cannot be obtained by this method, as the helper who applies the foot pedal cannot maintain a uniform pressure nor can the mechanic who makes the adjustment and rotates the wheel determine whether one wheel rotates with greater resistance than another, as it is merely a matter of feel and guess work both on the part of the mechanic and the helper.

The object of the present invention is to provide a method and apparatus whereby an accurate and predetermined pressure may be obtained on each brake when testing and adjusting the same. The invention, briefly stated, embodies means for applying and maintaining a predetermined pressure on the brake pedal and the brakes actuated thereby while testing and adjusting the same; and further provides means for rotating the wheels against the pressure of the brakes and for accurately measuring the resistance of each brake when the wheels are rotated.

The invention is shown by way of illustration in the accompanying drawings, in which;

Figure 1 is a sectional side elevation of an automobile equipped with four-wheel brakes, said view showing the application of the brake testing equipment, Figure 2 is a side elevation partly broken away and partially in section of the mechanism whereby a predetermined pressure may be exerted on the brake pedal, Figure 3 is a plan view of one of the trucks whereby the wheels of the automobile are supported, Figure 4 is a side elevation of the same, said view also showing the lever whereby the truck rollers and the wheel are rotated, Figure 5 is an edge view of the lever, Figure 6 is an enlarged side elevation of the same partially in section, Figure 7 is an end view of the lever.

Referring to the drawings in detail and particularly Figure 1, A indicates the main frame of an automobile, 2 the rear wheels, and 3 the front wheels. The automobile is equipped with the usual type of foot-actuated brake pedal, such as shown at 4, and this may be connected in any suitable manner with the front and rear brakes indicated at 5 and 6. The equipment employed when adjusting and testing the brakes comprises trucks, such as indicated at B and C, supporting the wheels of the vehicle, a lever, such as indicated at D, for rotating the wheels against the resistance of the brakes, a gauge or similar device, such as indicated at E, for indicating the resistance, a jack F for depressing the foot brake pedal and for maintaining it depressed while the test is taking place, and a gauge G on the jack for indicating the amount of pressure which is applied to the brake pedal and the brakes actuated thereby.

Four trucks are required, one for each wheel. These trucks are substantially identical in construction and are perhaps best illustrated in Figures 3 and 4. Each truck consists of side plates, such as shown at 7 and 8, between which are journaled a pair of roughened or corrugated rollers, such as shown at 9 and 10. These rolls form a support for one wheel or another, as shown in Figure 1, and means are provided for rotating the rolls so as to impart a rotation to the wheel. The means employed in the present instance is a gear 11 secured on a shaft 12, a pair of intermediate gears 13, and a pair of intermeshing gears, one on each roller as shown at 14 and 15. One end of the shaft 12 projects and a lever, such as indicated at D, is applied to the projecting end of the shaft which is square, and when the lever is swung, rotation is transmitted through the gears to the rolls and these in turn rotate the wheel or wheels to be tested. Two of the trucks, i. e., the trucks which receive the rear wheels, are stationary and as such may be bolted by means of flanges, such as indicated at 16, to the floor or any other suitable support. The two front trucks indicated at C are supported by means of rollers, such as shown at 17 on trackway 18. The front trucks C when the device is not in use normally assume a position adjacent the stationary trucks B and when the brakes of a car are to be tested, the front wheels are driven up a pair of inclined plates, such as shown at 19. They pass over the rolls of the stationary truck and then engage the rolls of the forward trucks. As the rear wheels of the automobile continue to drive or rotate, the forward truck moves forward along the trackway 18 until the rear wheels pass up the inclined plates and rest on the rollers of the stationary trucks. The front trucks are, in other words, adjustable as they are mounted on the trackway for wheel bases of varying lengths and practically any automobile (whether small or large) can thus be taken care of. It also makes it possible to test both two and four-wheel brakes.

The lever D whereby the rolls 9 and 10 and the wheel supported thereby is rotated, is best illustrated in Figures 5, 6 and 7. It consists of a main lever 19, the lower end of which is provided with a square opening 20 to receive the squared end of the shaft 12. Pivotally secured to the main lever at the point 21 is a secondary lever 22 and interposed between the levers is a plurality of compression springs 23. The two levers are interlocked by a latch member 24, i. e., they are locked against separation but they may be swung toward each other to compress the springs 23 when the secondary lever is swung in the direction of the arrow (see Figure 6). If the brakes of the vehicle are applied and the lever D is employed, it is obvious that more or less force will be required to swing the lever when rotating the rollers 9 and 10 and the vehicle wheel, depending upon the pressure which is being applied by the brake. It is desirable to register the force, or in other words, the resistance of the brake. A gauge, such as indicated at E, is employed for this purpose. Any ordinary gauge may be employed. In the present instance an ordinary pressure gauge equipped with a Bourdon tube, together with a link and rack movement, is employed to rotate the hand over the dial. The free end of the Bourdon tube is in this instance connected with a rod, such as shown at 25, and this engages a post 26 which is secured to the main lever 19. Hence, when the lever D is applied to the squared end of the shaft 12 and swung in the direction of arrow $a$ (see Figures 1 and 6) there will be a tendency for the secondary lever to compress the springs 23. This forces the post 26 against the pin 25, thereby pushing it inwardly with relation to the gauge. The inward movement of the pin affects the position of the Bourdon tube and as the tube changes its position, its movement is registered by the hand moving over the dial. The resistance to rotation is accordingly indicated.

The jack indicated at F is best illustrated in Figures 1 and 2. It consists of a housing 27 in which is slidably mounted a rack bar 28. Mounted in the outer end of the rack bar is a plunger 29 in which is formed a foot lug 30 which is adapted to engage the brake pedal 4 of an automobile, as shown in Figure 1. The end of the housing 27 is provided with a foot extension 31 and this is adapted to engage the front portion of the seat of the automobile. The rack bar 28 must be extended when the foot pedal is to be depressed and a lever actuated gear, such as shown at 32 is accordingly employed. The gear is pivotally mounted in a bearing 33 forming a part of the rack bar housing. The gear meshes with the rack bar and it is rotated by means of a lever 34 and a pawl 35. Swinging of the lever in the direction of arrow $b$ forces the rack bar outwardly and the foot pedal is accordingly engaged and depressed to any extent desired, the rack bar being secured in its extended position by means of the pawl 36. It is not only desirable to depress the foot pedal and to maintain it depressed while the test is taking place but it is also desirable to determine the amount of pressure which is being applied to the foot pedal when the brake is actuated thereby. A gauge G, similar or identical to the gauge E which has already been described, is accordingly employed, i. e., the gauge G is employed with a pin, such as indicated at 25$a$. This pin actuates the movement within the gauge just as the pin 25 does in the gauge indicated at E, the only difference as far as actuation is concerned is that the plunger indicated at 29 is provided with an inclined face, such as shown at 37, and a spring 38, i. e., as the rack bar 28 is being advanced and the foot pedal depressed, the plunger 29 moves inwardly and compresses the spring 38. The inclined face 37 at the same time forces the pin 25$a$ inwardly within the gauge and as such actuates the gauge movement and swings the indicator over the dial. The dial may be graduated in any manner desired, for instance to indicate the pounds of pressure or whatever the case may be. It is, accordingly, possible to depress the foot pedal and to apply any pressure desired, for instance twenty-five pounds, fifty pounds, seventy-five pounds or whatever the case may be. The pressure applied to the brakes will be proportional and the resistance to rotation will also be proportional.

In actual practice when the automobile is driven up and positioned on the trucks, as shown in Figure 1, the jack F is applied to the foot pedal and it is depressed and a predetermined pressure is applied, say for instance fifty pounds. The lever D is then applied to the shaft 12 of one of the trucks, and the rollers together with the wheels supported thereby, are rotated, the amount of pressure exerted by the brake being indicated on the gauge E. If the brake is properly adjusted, the pressure indicated may for instance be seventy pounds. Lever D, after one wheel has been tested, is removed and applied to the next truck. The wheel is rotated in the same manner and if the gauge registers sixty pounds, it shows that that particular brake is slightly slack. It is accordingly adjusted or tightened until it registers seventy pounds. Each wheel is tested in successive order and the result will be that the brakes will positively register and apply the same pressure when the foot pedal is depressed. After the adjusting and testing of the brakes is completed, the jack F is removed, the rollers on the rear truck B are locked or held against rotation by the lever D, and the car is backed off by its own power, i. e., the rear wheels are backed off the rear truck and down the inclined plates 19, the front trucks will at the same time be pulled along the trackway 18 until they engage with the stationary trucks B, and the front wheels will then roll off and pass over the trucks B and the inclined plates 19. The vehicle is then ready for delivery.

A number of different types of jacks could readily be employed for depressing and exerting a constant pressure on the foot pedal and the brakes actuated thereby, for instance screw jacks, hydraulic jacks and the like, and while it is desirable to indicate the pressure applied as by means of the gauge G, any other indicating means may be employed; similarly, while a manually controlled mechanism is here illustrated for rotating the rolls and thereby the wheels of the vehicle against the resistance of the brakes, it is obvious that power driven means may be employed, such as electric motors and the like, and that the resistance imposed by the brakes in such a case could readily be registered by a voltmeter, ammeter or the like. In other words, any mechanism desired for rotating the wheels while the brakes are applied can be employed, providing a cooperating mechanism is used which will register the resistance. The mechanism illustrated in the present instance merely illustrates one method of accomplishing the result desired. For example, the pedal depresser shown in my copending application, Serial Number 156,497 filed December 22, 1926, may be and has been employed in this combination, and method of adjusting brakes.

While other features of the present invention are more or less specifically described, I wish it understood that various changes may be resorted to within the scope of the appended claims; similarly, that the materials and finishes of the several parts employed may be such as the manufacturer may decide or varying conditions or uses may demand.

Having thus described my invention, what I claim and desire to secure by Letters Patent is:—

1. A method of testing vehicle brakes which consists in applying a predetermined pressure on the brake pedal and the brakes actuated thereby, rotating the wheels of the vehicle against the resistance of the brakes, and then determining the resistance.

2. A vehicle wheel brake tester comprising means engaging a wheel to rotate the same against the resistance of its brake, means responsive to the turning effort of the wheel to indicate the resistance of the brake thereto, and means for applying pressure to the brake and for measuring the pressure so applied.

3. A vehicle wheel brake tester comprising means engaging a wheel to rotate the same against the resistance of its brake, means responsive to the turning effort of the wheel to indicate the resistance of the brake thereto, adjustable means whereby pressure is applied to the brake, and a measuring instrument cooperating therewith and indicating the amount of pressure applied.

4. The method of testing the brakes of an automobile which consists in temporarily supporting the wheels of the automobile for turning movement, applying and maintaining a measured predetermined pressure to the brake pedal and to the brakes actuated thereby, rotating the wheels against the resistance of their respective brakes, and adjusting the brakes so that the combined braking effort of all the brakes is correlated and equalized with the aforesaid predetermined pressure applied to the brake pedal.

HARRY H. PATTON.